US011265798B2

(12) United States Patent
Kloiber et al.

(10) Patent No.: US 11,265,798 B2
(45) Date of Patent: Mar. 1, 2022

(54) METHOD AND RADIO COMMUNICATION SYSTEM FOR AN INDUSTRIAL AUTOMATION SYSTEM

(71) Applicant: Siemens Aktiengesellschaft, Munich (DE)

(72) Inventors: Bernhard Kloiber, Feldkirchen-Westerham (DE); Siegfried Richter, Lauf (DE); Florian Zeiger, Höhenkirchen-Siegertsbrunn (DE); Johannes Riedl, Ergolding (DE); Joachim Walewski, Unterhaching (DE)

(73) Assignee: Siemens Aktiengesellschaft, Munich (DE)

( * ) Notice: Subject to any disclaimer, the term of this patent is extended or adjusted under 35 U.S.C. 154(b) by 28 days.

(21) Appl. No.: 16/965,887

(22) PCT Filed: Jan. 10, 2019

(86) PCT No.: PCT/EP2019/050539
§ 371 (c)(1),
(2) Date: Jul. 29, 2020

(87) PCT Pub. No.: WO2019/149494
PCT Pub. Date: Aug. 8, 2019

(65) Prior Publication Data
US 2021/0045035 A1 Feb. 11, 2021

(30) Foreign Application Priority Data
Jan. 31, 2018 (EP) .................................... 18154465

(51) Int. Cl.
*H04W 52/26* (2009.01)
*H04W 84/20* (2009.01)
(Continued)

(52) U.S. Cl.
CPC ......... *H04W 40/12* (2013.01); *H04W 52/265* (2013.01); *H04W 74/085* (2013.01); *H04W 84/20* (2013.01)

(58) Field of Classification Search
CPC ..... H04W 84/18; H04W 84/20; H04W 52/26; H04W 52/265
See application file for complete search history.

(56) References Cited

U.S. PATENT DOCUMENTS 6,246,883 B1    6/2001  Lee
2004/0018839 A1 1/2004  Andric et al.
(Continued)

FOREIGN PATENT DOCUMENTS

EP    2712124    3/2014
EP    3211838    8/2017
(Continued)

OTHER PUBLICATIONS

PCT International Search Report and Written Opinion of International Searching Authority dated Feb. 26, 2019 corresponding to PCT International Application No. PCT/EP2019/050539 filed Jan. 10, 2019.

*Primary Examiner* — Robert C Scheibel
(74) *Attorney, Agent, or Firm* — Cozen O'Connor

(57) ABSTRACT

A radio communication system for an industrial automation system includes at least one first communication device operated as a radio base station, and several second radio communication devices operated as radio subscriber stations, wherein the first communication device is arranged or movable on a vehicle, where the first communication device and the second communication devices can be assigned to a group of communication devices and can only be connected to one another in a wireless manner within the same group of communication devices, where the first communication device and the second communication devices detect within (Continued)

their assigned communication device group distances between the first communication device and the respective second communication device, on the basis of signal strength measurement values or position data and where, depending on the detected distances, the first communication device allocates radio resources for a radio communication with the respective second communication device.

18 Claims, 2 Drawing Sheets

(51) Int. Cl.
  *H04W 40/12* (2009.01)
  *H04W 74/08* (2009.01)

(56) References Cited

U.S. PATENT DOCUMENTS

| | | |
|---|---|---|
| 2017/0288827 A1 | 10/2017 | Bayesteh et al. |
| 2017/0359190 A1 | 12/2017 | Nadathur et al. |

FOREIGN PATENT DOCUMENTS

| | | |
|---|---|---|
| EP | 3211962 | 8/2017 |
| WO | 2009153817 | 12/2009 |
| WO | 2013112465 | 8/2013 |

METHOD AND RADIO COMMUNICATION SYSTEM FOR AN INDUSTRIAL AUTOMATION SYSTEM

CROSS-REFERENCE TO RELATED APPLICATIONS

This is a U.S. national stage of application No. PCT/EP2019/050539 filed 10 Jan. 2019. Priority is claimed on European Application No. 18154465.1 filed 31 Jan. 2018, the content of which is incorporated herein by reference in its entirety.

BACKGROUND OF THE INVENTION

1. Field of the Invention

The invention relates to industrial automation systems and, more particularly, to a method and radio Communication System for an industrial automation system.

2. Description of the Related Art

Industrial automation systems are used for monitoring, controlling and regulating technical processes, in particular in the field of production, process and buildings automation, and allow operation of control facilities, sensors, machines and industrial installations that, as far as possible, is supposed to occur on its own and independently of human intervention. On account of continuously increasing importance of information technology for automation systems that comprise numerous networked control and computer units, methods for reliably providing functions that are distributed over an automation system and intended to provide monitoring, control and regulation functions are becoming increasingly important.

Interruptions in communication connections between computer units of an industrial automation system or automation devices can result in undesirable or unnecessary repetition of a communication of a service request. Additionally, messages that are not communicated or not communicated completely can prevent an industrial automation system from changing to or remaining in a safe operating state, for example. This can ultimately result in failure of a complete production installation and a costly production outage. A particular problem in industrial automation systems regularly results from message traffic having a comparatively large number of messages but relatively short messages, as a result of which the above problems are intensified.

In Erik Westerberg "4G/5G RAN architecture", Ericsson Technology Review, Jul. 22, 2016, ISSN 0014-0171-284 23-3283, an architecture for 4G and 5G mobile radio systems is proposed that affords increased spectral efficiency and improved flexibility for realizing mobile radio systems. The architecture comprises a packet processing function (PPF) and a baseband signal processing function (baseband processing function (BPF)) at the user level. Additionally, the architecture has provision for an antenna-proximate radio function (RF) and a radio control function (RCF) at the control level. The packet processing function and the baseband signal processing function can either be integrated in network nodes or operated in a virtualized environment, with hybrid forms being possible.

EP 2 712 124 A1 discloses a redundantly operated industrial communication system having communication devices redundantly connected to an industrial communication network, where messages are transmitted wirelessly at least in sections. A plurality of buffer storage units for message elements received in a wired manner at a network node and for message elements to be wirelessly transmitted by the latter are provided in the industrial communication network. If a maximum buffer size is exceeded, then an oldest message element in the respective buffer storage unit is deleted. Until the maximum buffer size is exceeded, the oldest message element is selected as the next message element to be wirelessly transmitted.

EP 3 211 838 discloses a first communication device having a redundancy function that is redundantly connected to a first switch or the like via a first and second communication network port in a redundantly operable industrial communication system. Analogously, a second communication device having a redundancy function is redundantly connected to a second switch or the like via a first and second communication network port. Data frames conveyed from the first communication network port of the first and second communication devices to the respective switch are assigned to a first virtual local area network, while data frames conveyed from the second communication network port of the first and second communication devices to the respective switch are assigned to a second virtual local area network. Data frames assigned to the first virtual local area network are sent via a first radio network via a respective first radio transceiver station, while data frames assigned to the second virtual local area network are sent via a second radio network via a respective second radio transceiver station.

EP 3 211 962 A1 relates to a radio communication system for an industrial automation system, where at least one first and one second communication device are redundantly connected to an industrial communication network. The first and second communication devices are each indirectly or directly connected to a respective first and to a respective second radio transceiver station via their first and second communication network port.

The first and second radio transceiver stations stipulate an order for data frames that are to be sent within a prescribed time interval based on destination MAC addresses assigned to the data frames that are to be sent. The order within data frames that are to be sent to a selected destination MAC address is stipulated by their input order.

US 2017/359190 A1 discloses a control system having a mobile controller unit that is realized via a smartphone or laptop and that can be assigned to multiple controlled devices as a superordinate control unit. Availability information is exchanged between the controller unit and the associated devices. An availability map created based on the availability information is used by the controller unit to select a communication path for accessing a device controlled by the controller unit.

SUMMARY OF THE INVENTION

It is an object of the present invention to provide a radio communication system for an industrial automation system having mobile communication subscribers that allows efficient and low-interference radio resource use, and to provide a method for the operation thereof and suitable system components.

This and other objects and advantage are achieved in accordance with the invention by a radio communication system, a radio base station and by a method, wherein the radio communication system, in accordance with the invention, for an industrial automation system comprises at least one first communication device, operated as a radio base station, which comprises at least one radio transceiver unit, and includes multiple second communication devices, operated as radio subscriber stations, which are each wirelessly connectable to the first communication device and comprise at least one radio transceiver unit. The first communication device is arranged or movable on a vehicle. By contrast, standard radio base stations are arranged in a fixed manner and are not mobile. The first communication device and the second communication devices can be assigned to a wireless local area network, a Worldwide Interoperability for Microwave Access (WiMAX) mobile radio network, a Universal Mobile Telecommunications System (UMTS) mobile radio network, a Long-Term Evolution (LTE) mobile radio network, a 5G mobile radio network or another mobile radio network, for example. Preferably, the first communication device and the second communication devices are configured for carrier-sense multiple access (CSMA) collision avoidance or to use listen before talk. Furthermore, the first communication device is advantageously configured to process a mobility management entity or serving gateway protocol stack.

In accordance with the invention, the first communication device and the second communication devices are each configured to be assigned to a communication device group. The first communication device and the second communication devices are wirelessly connectable to one another only within the same communication device group. Additionally, the first communication device and the second communication devices are each configured to interchange data frames with one another that are transmitted via radio resources reserved for their associated communication device group.

The first communication device and the second communication devices are, in accordance with the invention, further configured to determine distances between the first communication device and the respective second communication device within their associated communication device group based on signal strength measured values or position data. Furthermore, the first communication device is configured to allocate radio resources for a radio communication with the respective second communication device within the associated communication device group based on the determined distances. The radio resources comprise carrier frequencies, bandwidth, transmission time windows or transmission power.

In addition, the first communication device is, in accordance with the invention, configured to prescribe or control a reduction in transmission power, increased quality-of-service requirements or changed coding or modulation schemes for a radio communication with the respective second communication device if the distance decreases. Preferably, the first communication device is configured to allocate the radio resources adaptively. By way of example, it is thus possible for cell sizes in mobile radio systems to be adaptively reduced the closer communication subscribers are to one another within a group. Moreover, interference between communication device groups can be reduced in this way. In particular, improved quality-of-service parameters can be achieved as the distance between the communication devices within a communication device group decreases.

In accordance with a preferred embodiment of the present invention, the second communication devices are configured, to convey details pertaining to respectively assigned production tasks or automation tasks or functions to the first communication device during a registration process on a first communication device operated as a radio base station. Additionally, the first communication device is configured to take the conveyed details as a basis for assigning second communication devices to its own communication device group or rejecting registration requests from second communication devices. The respective first or second communication device can be assigned to a communication device group based on a status of a production task, an automation task or function, a device position or a prescribed time range, for example.

Advantageously, there can be provision for multiple communication devices operable as a radio base station. The communication devices operable as a radio base station are designed and configured to discover further communication devices operable as a radio base station within their radio range and to check discovered communication devices for whether they are assigned to the same communication device group. Furthermore, the communication devices operable as a radio base station are in this case configured to take a device identifier or a priority value among one another as a basis for selecting the first communication device operated as a radio base station, if there are further communication devices operable as a radio base station present within their radio range that are assigned to the same communication device group.

In accordance with a further advantageous embodiment of the present invention, the communication devices operable as a radio base station are selectively operable as a radio subscriber station. Communication devices that are not selected as a first communication device each have an assigned role as a second communication device. Furthermore, the communication devices operable as a radio base station are preferably designed and configured to make a fresh selection of the first communication device operated as a radio base station, if the first communication device fails and further communication devices operable as a radio base station are present within their radio range. In this way, failure of a base station is no longer a single point of failure, or such as failure has no adverse effects on adjoining radio cells.

Additionally, the first communication device and the second communication devices are advantageously configured to interchange data frames with one another that are transmitted via radio resources reserved exclusively for their associated communication device group. In accordance with a further advantageous embodiment, the first communication device can be configured to release unneeded radio resources for use by other communication device groups. This allows particularly efficient use of radio resources.

It is also an object of the invention to provide a radio base station for a communication system in accordance with the above disclosed embodiments of the invention, where the radio base station comprises at least one radio transceiver unit, so that the radio base station is wirelessly connectable to communication devices operated as radio subscriber stations. Furthermore, the radio base station is arranged or movable on a vehicle and is configured to be assigned to a communication device group. The radio base station is wirelessly connectable to communication devices operated as radio subscriber stations only within the same communication device group.

In accordance with disclosed embodiments of the invention, the radio base station is configured to interchange with communication devices operated as radio subscriber stations data frames that are transmitted via radio resources reserved for their associated communication device group. Moreover, the radio base station is configured to determine distances from communication devices operated as radio subscriber stations within their associated communication device group based on signal strength measured values or position data. Additionally, the radio base station is configured to allocate radio resources for a radio communication with the respective communication device operated as a radio subscriber station within the associated communication device group on the basis of the determined distances. The radio resources comprise carrier frequencies, bandwidth, transmission time windows or transmission power. In addition, the radio base station is configured to prescribe or control a reduction in transmission power, increased quality-of-service requirements or changed coding or modulation schemes for a radio communication with the respective communication device operated as a radio subscriber station if the distance decreases.

It is also an object of the to provide a method for operating a radio communication system in accordance with the above-disclosed embodiments of the invention, where the method comprises operating at least one first communication device as a radio base station, which has at least one radio transceiver unit, and multiple second communication devices, operated as radio subscriber stations, which are each wirelessly connectable to the first communication device and have at least one radio transceiver unit. The first communication device is arranged or movable on a vehicle. Further, the first communication device and the second communication devices are assignable to a communication device group and wirelessly connectable to one another only within the same communication device group.

In accordance with the method of the invention, the first communication device and the second communication devices interchange data frames with one another that are transmitted via radio resources reserved for their associated communication device group. Moreover, the first communication device and the second communication devices determine distances between the first communication device and the respective second communication device within their associated communication device group based on signal strength measured values or position data. The first communication device allocates radio resources for a radio communication with the respective second communication device within the associated communication device group based on the determined distances. The radio resources comprise carrier frequencies, bandwidth, transmission time windows or transmission power. The first communication device prescribes or controls a reduction in transmission power, increased quality-of-service requirements or changed coding or modulation schemes for a radio communication with the respective second communication device if the distance decreases.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is illustrated in more detail below using an exemplary embodiment with reference to the drawing, in which.

DETAILED DESCRIPTION OF THE EXEMPLARY EMBODIMENTS

Figure 1:
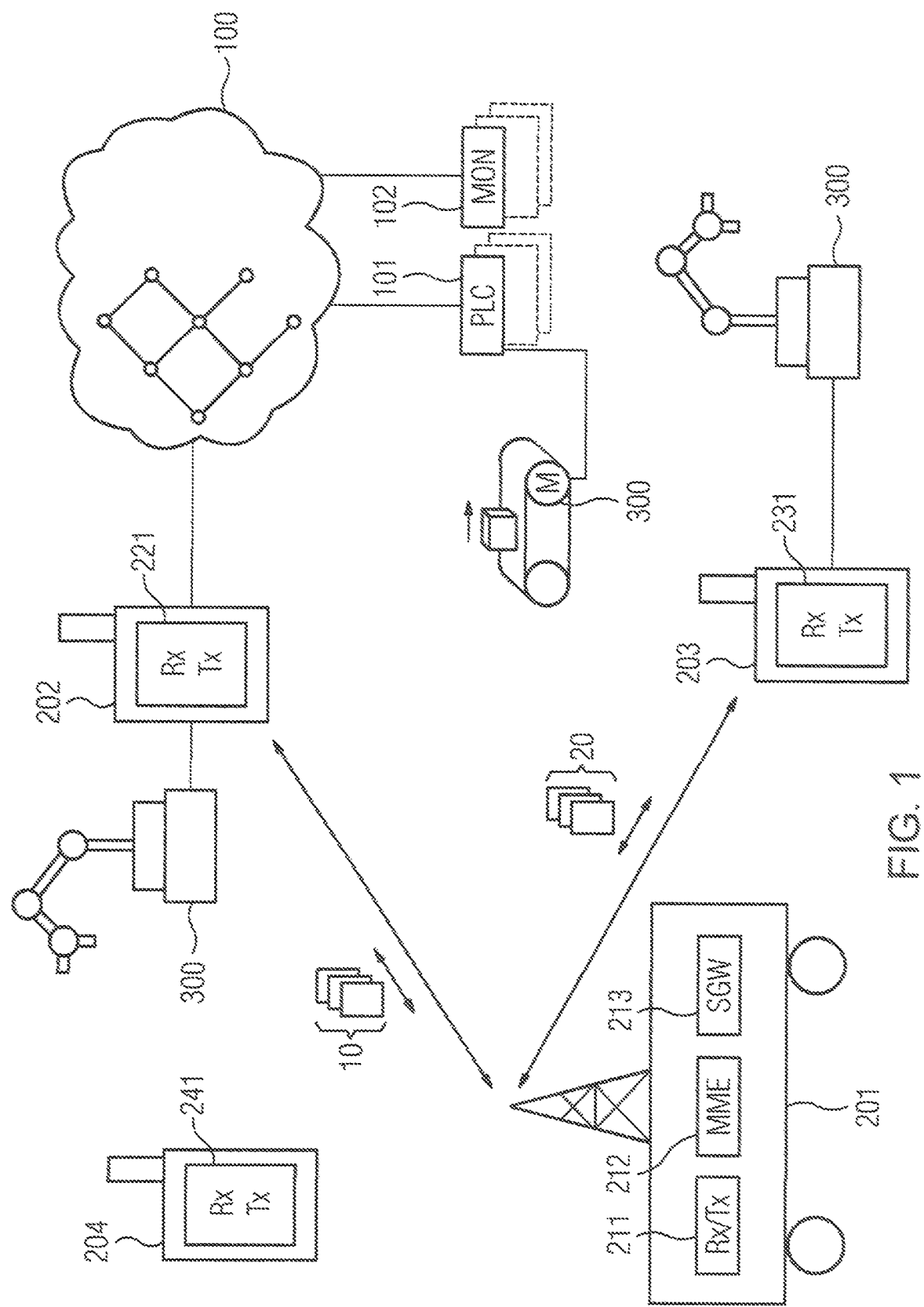
FIG. 1 shows an industrial automation system having a communication network and a radio communication system connected thereto.

The industrial automation system depicted in FIG. 1 comprises a communication network 100 to which multiple automation devices 101, 102 and a radio communication system are connected. The radio communication system in the present exemplary embodiment comprises a radio base station 201 and multiple radio subscriber stations 202, 203, 204, which are wirelessly connectable to the radio base station 201. A first radio subscriber station 202 is connected to the communication network 100 by wire.

The communication network 100 comprises a multiplicity of network nodes on which network infrastructure devices are provided. The network infrastructure devices 200-202 may be switches, routers or firewalls, for example, and can be used to connect automation devices 101, 102. Automation devices include in particular programmable logic controllers 101, input/output units (I/O modules) or operating and observation stations 102 of the industrial automation system. Additionally, the communication network 100 can also comprise network nodes having a packet data network gateway (PGW) and a home subscriber server (HSS), which are functionally associated with the radio communication system.

Programmable logic controllers 101 typically each comprise a communication module, a central unit and at least one input/output unit. Input/output units may fundamentally also be formed as local peripheral modules arranged remotely from a programmable logic controller. The communication module thereof can be used to connect a programmable logic controller 101 to a switch or router or additionally to a field bus, for example. The input/output unit is used for interchanging control and measured variables between a programmable logic controller 101 and a sensor, or a controlled machine or installation, 300 connected to the programmable logic controller 101. A sensor or a machine or installation 300 can fundamentally also be connected to a programmable logic controller 101 via the radio communication system. The central unit of a programmable logic controller 101 is provided in particular for determining suitable control variables from captured measured variables. The above components of a programmable logic controller 101 can be connected to one another via a backplane bus system, for example.

An operating and observation station 102 is used in particular to visualize process data or measured and control variables that are processed or captured by programmable logic controllers, input/output units or sensors. In particular, an operating and observation station 102 is used to display values of a control loop and to alter control parameters. Operating and observation stations 102 comprise at least a graphical user interface, an input device, a processing unit and a communication module.

Both the radio base station 201 and the radio subscriber stations 200, 203 each comprise, besides an antenna arrangement, a radio transceiver unit 211, 221, 231, 241 having a PHY functional unit and an MAC functional unit. The radio base station 201 and the radio subscriber stations 202, 203, 204 can be assigned to a wireless local area network, a Worldwide Interoperability for Microwave Access (WiMAX)mobile radio network, a Universal Mobile Telecommunications System (UMTS)mobile radio network, a Long-term Evolution (LTE) mobile radio network, a 5G mobile radio network or another mobile radio network, for example. Furthermore, the radio base station 201, on the one hand, and the radio subscriber stations 202, 203, 204, on the other hand, are fundamentally configured to use the radio base station 201 to interchange data frames 10, 20. In the present exemplary embodiment, the data frames 10, 20 particularly comprise process data or measured and control variables that are assigned to vehicles or sensors, machines or installations 300 connected to the radio base station 201 or to the radio subscriber stations 202, 203. Preferably, the radio base station and the radio subscriber stations are configured for carrier-sense multiple access (CSMA) collision avoidance and to use listen before talk.

In the present exemplary embodiment, the radio base station 201 is arranged or movable on a vehicle. By way of example, such a vehicle can be an automated guided vehicle that accepts workpieces from a first robot assigned to the first radio subscriber station 202 and transports the workpieces to a second robot, assigned to a second radio subscriber station 203, for further processing. In principle, the radio base station 201 and the radio subscriber stations 202, 203, 204 can each be assigned to a communication device group. The radio base station 201 and the radio subscriber stations 202, 203, 204 are wirelessly connectable to one another only within the same communication device group, however. In particular, the radio base station 201 and the radio subscriber stations 202, 203, 204 are configured to interchange data frames 10, 20 with one another that are transmitted via radio resources reserved exclusively for their associated communication device group.

Radio base stations or radio subscriber stations can be assigned to a communication device group based on a status of a production task, an automation task or function, a device position or a prescribed time range, for example. In the present exemplary embodiment, the radio base station 201 and also the first radio subscriber station 202 and the second radio subscriber station 203 are assigned to the same communication device group based on the above transport or automation task, which group in particular does not comprise the radio subscriber station 204, however.

The radio base station 201 and the radio subscriber stations 202, 203 determine distances between the radio base station 201 and the respective radio subscriber station 202, 203 within their communication device group based on signal strength measured values or position data. In addition, the radio base station 201 is configured to allocate radio resources adaptively for a radio communication with the respective radio subscriber station 202, 203 within its communication device group based on the determined distances. The radio resources comprise carrier frequencies, bandwidth, transmission time windows, communication network partitions or transmission power, for example. Furthermore, the radio base station 201 is configured to process a mobility management entity (MME) and a serving gateway (SGW) protocol stack. Accordingly, the radio base station 201 comprises an MME functional unit 212 and an SGW functional unit 213.

In particular, the radio base station 201 is configured to prescribe or control a reduction in transmission power, increased quality-of-service requirements and changed coding or modulation schemes for a radio communication with the respective radio subscriber station 202, 203 if the distance decreases. Additionally, the radio base station 201 is preferably configured to release unneeded radio resources for use by other communication device groups.

In the present exemplary embodiment, the radio subscriber stations 202, 203, 204 are configured to convey details pertaining to respectively assigned production tasks or automation tasks or functions to the radio base station during a registration process on a radio base station. Accordingly, the radio base station 201 is configured to take the conveyed details as a basis for assigning radio subscriber stations to its own communication device group or rejecting registration requests from radio subscriber stations.

If there is provision for multiple communication devices operable as a radio base station, communication devices operable as a radio base station discover further communication devices operable as a radio base station within their radio range. The discovered communication devices are then checked for whether they are assigned to the same communication device group. If there are further communication devices operable as a radio base station present within their radio range, then the communication devices operable as a radio base station that are assigned to the same communication device group take a device identifier or a priority value among one another as a basis for selecting the first communication device operated as a radio base station. Communication devices that are operable either as a radio base station or as a radio subscriber station are preferably assigned a role as a radio subscriber station, provided that they are not given a role as a radio base station after the above selection. Advantageously, the communication devices operable as a radio base station are configured to make a fresh selection of the communication device operated as a radio base station, if the selected radio base station fails and further communication devices operable as a radio base station are present within their radio range.

Figure 2:
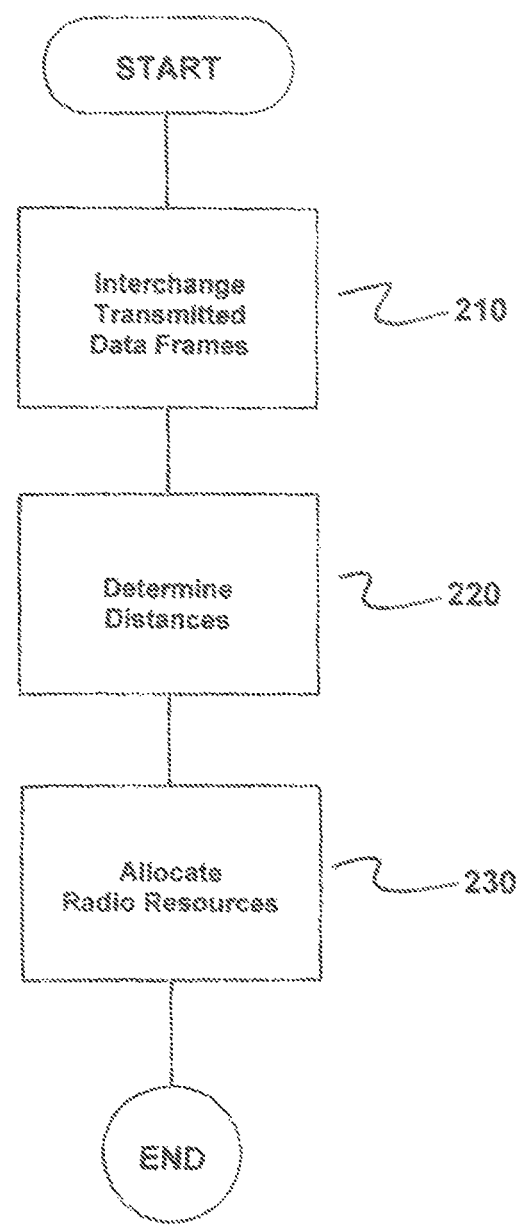
FIG. 2 is a flowchart of the method in accordance with the invention.

FIG. 2 is a flowchart of a method for operating a radio communication system for an industrial automation system, where the radio communication system comprises at least one first communication device 201, operated as a radio base station, and includes at least one radio transceiver unit 211, and comprises a plurality of second communication devices 202, 203, 204, operated as radio subscriber stations, which are each wirelessly connectable to the first communication device and have at least one radio transceiver unit 221, 231, 241, and where the first communication device and the second communication devices are assignable to a communication device group and are wirelessly connectable to one another only within the same communication device group.

The method comprises interchanging transmitted data frames 10, 20 between the first communication device and the second communication devices via of radio resources reserved for their associated communication device group, as indicated in step 210.

Next, the first communication device and the plurality of second communication devices determine distances between the first communication device and a respective second communication device within their associated communication device group based on either signal strength measured values and/or position data, as indicated in step 220.

Next, the first communication device allocates radio resources for a radio communication with the respective second communication device within the associated communication device group based on the determined distances, as indicated in step 230. Here, the radio resources comprising either carrier frequencies, bandwidth, transmission time windows and/or transmission power.

In accordance with the method of the invention, the first communication device prescribes or controls a reduction in transmission power, increased quality-of-service requirements and/or at least one of changed coding and modulation schemes for a radio communication with the respective second communication device if the distance decreases. In addition, the first communication device is arranged or movable on a vehicle.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A radio communication system for an industrial automation system, comprising:
    at least one first communication device, operated as a radio base station, that comprises at least one radio transceiver unit;
    a plurality of second communication devices, operated as radio subscriber stations, which are each wirelessly connectable to the first communication device and comprise at least one radio transceiver unit;
    wherein the first communication device and the plurality of second communication devices are each configured to be assigned to a communication device group;
    wherein the first communication device and the plurality of second communication devices are wirelessly connectable to one another only within the same communication device group;
    wherein the first communication device and the plurality of second communication devices are each configured to interchange data frames with one another which are transmitted via radio resources reserved for their associated communication device group;
    wherein the first communication device and the plurality of second communication devices are each configured to determine distances between the first communication device and a respective second communication device within their associated communication device group based on at least one of (i) signal strength measured values and (ii) position data;
    wherein the first communication device is arranged or movable on a vehicle;
    wherein the first communication device is further configured to allocate radio resources for a radio communication with the respective second communication device within the associated communication device group based on the determined distances, the radio resources comprising at least one of (i) carrier frequencies, (ii) bandwidth, (iii) transmission time windows and (iv) transmission power; and
    wherein the first communication device is further configured to prescribe or control at least one of (i) a reduction in transmission power, (ii) increased quality-of-service requirements and (iii) at least one of changed coding and modulation schemes for a radio communication with the respective second communication device if the distance decreases.

2. The communication system as claimed in claim 1, wherein the plurality of second communication devices are further configured to convey details pertaining to at least one of (i) respectively assigned production tasks and (ii) automation tasks or functions to the first communication device during a registration process on a first communication device operated as a radio base station; and
    wherein the first communication device is further configured to take the conveyed details as a basis for one of (i) assigning second communication devices to its own communication device group and (ii) rejecting registration requests from second communication devices.

3. The communication system as claimed in claim 1, wherein the respective first or second communication device is assigned to a communication device group based on one of (i) a status of a production task, (ii) an automation task or function, (iii) a device position and (iv) a prescribed time range.

4. The communication system as claimed in claim 2, wherein the respective first or second communication device is assigned to a communication device group based on one of (i) a status of a production task, (ii) an automation task or function, (iii) a device position and (iv) a prescribed time range.

5. The communication system as claimed in claim 1, wherein a plurality of communication devices are operable as a radio base station;
    wherein each of the plurality of communication devices operable as the radio base station are further configured to discover further communication devices operable as a radio base station within radio range and to check discovered communication devices for whether said discovered communication devices are assigned to the same communication device group; and
    wherein the communication devices operable as a radio base station are further configured to take at least one of (i) a device identifier and (ii) a priority value among one another as a basis for selecting the first communication device operated as a radio base station, if there are further communication devices operable as a radio base station present within their radio range that are assigned to the same communication device group.

6. The communication system as claimed in claim 2, wherein a plurality of communication devices are operable as a radio base station;
    wherein each of the plurality of communication devices operable as the radio base station are further configured to discover further communication devices operable as a radio base station within radio range and to check discovered communication devices for whether said discovered communication devices are assigned to the same communication device group; and
    wherein the communication devices operable as a radio base station are further configured to take at least one of (i) a device identifier and (ii) a priority value among one another as a basis for selecting the first communication device operated as a radio base station, if there are further communication devices operable as a radio base station present within their radio range that are assigned to the same communication device group.

7. The communication system as claimed in claim 3, wherein a plurality of communication devices are operable as a radio base station;

wherein each of the plurality of communication devices operable as the radio base station are further configured to discover further communication devices operable as a radio base station within radio range and to check discovered communication devices for whether said discovered communication devices are assigned to the same communication device group; and wherein the communication devices operable as a radio base station are further configured to take at least one of (i) a device identifier and (ii) a priority value among one another as a basis for selecting the first communication device operated as a radio base station, if there are further communication devices operable as a radio base station present within their radio range that are assigned to the same communication device group.

8. The communication system as claimed in claim 7, wherein the communication devices operable as a radio base station are selectively operable as a radio subscriber station and wherein communication devices which are not selected as a first communication device each have an assigned role as a second communication device.

9. The communication system as claimed in claim 7, wherein the communication devices operable as a radio base station are further configured to make a fresh selection of the first communication device operated as a radio base station, if the first communication device fails and further communication devices operable as a radio base station are present within their radio range.

10. The communication system as claimed in claim 8, wherein the communication devices operable as a radio base station are further configured to make a fresh selection of the first communication device operated as a radio base station, if the first communication device fails and further communication devices operable as a radio base station are present within their radio range.

11. The communication system as claimed in claim 1, wherein the first communication device is further configured to allocate the radio resources adaptively.

12. The communication system as claimed in claim 1, wherein the first communication device and the plurality of second communication devices are each further configured to interchange data frames with one another which are transmitted via radio resources reserved exclusively for their associated communication device group.

13. The communication system as claimed in claim 1, wherein the first communication device is further configured to release unneeded radio resources for use by other communication device groups.

14. The communication system as claimed in one of claim 1, wherein the first communication device and the plurality of second communication devices are each further configured for at least one of (i) carrier-sense multiple access (CSMA) collision avoidance and (ii) to use listen before talk.

15. The communication system as claimed in claim 1, wherein the first communication device and the plurality of second communication devices are assigned to at least one of (i) a wireless local area network, (ii) a Worldwide Interoperability for Microwave Access (WiMAX) mobile radio network, (iii) a Universal Mobile Telecommunications System (UMTS) mobile radio network, (iv) a Long-Term Evolution (LTE) mobile radio network, (v) a 5G mobile radio network and (vi) another mobile radio network.

16. The communication system as claimed in claim 1, wherein the first communication device is further configured to process at least one of (i) a mobility management entity and (ii) serving gateway protocol stack.

17. A radio base station for a communication system, comprising:

at least one radio transceiver unit;

wherein the radio base station is wirelessly connectable to communication devices operated as radio subscriber stations;

wherein the radio base station is configured to be assigned to a communication device group, the radio base station being wirelessly connectable to communication devices operated as radio subscriber stations only within the same communication device group;

wherein the radio base station is further configured to interchange with communication devices operated as radio subscriber stations data frames which are transmitted by means of radio resources reserved for their associated communication device group;

wherein the radio base station is further configured to determine distances from communication devices operated as radio subscriber stations within their associated communication device group based on at least one of (i) signal strength measured values and (ii) position data;

wherein the radio base station is arranged or movable on a vehicle;

wherein the radio base station is further configured to allocate radio resources for a radio communication with the respective communication device operated as a radio subscriber station within the associated communication device group based on the determined distances, the radio resources comprising at least one of (i) carrier frequencies, (ii) bandwidth, (iii) transmission time windows and (iv) transmission power;

wherein the radio base station is further configured to prescribe or control at least one of (i) a reduction in transmission power, (ii) increased quality-of-service requirements and (iii) at least one of changed coding and modulation schemes for a radio communication with the respective communication device operated as a radio subscriber station if the distance decreases.

18. A method for operating a radio communication system for an industrial automation system, the radio communication system comprising at least one first communication device, operated as a radio base station, and including at least one radio transceiver unit, and comprising a plurality of second communication devices, operated as radio subscriber stations, which are each wirelessly connectable to the first communication device and have at least one radio transceiver unit, and the first communication device and the second communication devices being assignable to a communication device group and wirelessly being connectable to one another only within the same communication device group, the method comprising:

interchanging transmitted data frames between the first communication device and the second communication devices via of radio resources reserved for their associated communication device group;

determining, by the first communication device and the plurality of second communication devices, distances between the first communication device and a respective second communication device within their associated communication device group based on at least one of (i) signal strength measured values and (ii) position data; and allocating, by the first communication device, radio resources for a radio communication with the respective second communication device within the associated communication device group based on the determined distances, the radio resources comprising at least one of (i) carrier frequencies, (ii) bandwidth, (iii) transmission time windows and (iv) transmission power;

wherein the first communication device prescribes or controls at least one of (i) a reduction in transmission power, (ii) increased quality-of-service requirements and (iii) at least one of changed coding and modulation schemes for a radio communication with the respective second communication device if the distance decreases; and wherein the first communication device is arranged or movable on a vehicle.

\* \* \* \* \*